United States Patent Office 3,498,404
Patented Mar. 3, 1970

3,498,404
FIRE RESISTANT POROUS ACOUSTIC BOARD WITH PERFORATIONS THROUGH METAL FACING SHEET
James R. Roberts, Palatine, Ill., assignor to United States Gypsum Company, Chicago, Ill., a corporation of Delaware
No Drawing. Filed Feb. 29, 1968, Ser. No. 709,233
Int. Cl. E04b 1/99
U.S. Cl. 181—33                              11 Claims

ABSTRACT OF THE DISCLOSURE

An acoustical ceiling board comprising a metal facing sheet adhered to a porous backing board with an acrylic adhesive, said facing sheet extending to within about ⅛ inch from each edge of said backing board and having perforations extending through said sheet and to within about ⅟₁₆ inch from the back surface of said board, said backing board preferably having a bend up to between ¼ inch and ⅝ inch depending on the size of the board concave to the surface of the facing sheet.

---

This invention relates to fire resistant building materials and more particularly to ceiling boards having good fire resistance and good acoustical properties.

Acoustical ceilings have been made from metal pans suspended from hangers as described in U.S. 2,789,321, but this type of construction creates a problem at the juncture of the ceiling with the walls. The outermost pans must be cut to fit at the walls and the cut edges tend to warp or buckle.

Ceilings have also been constructed of a lower layer of acoustical tile and an upper layer of fire resistant material such as mineral wool with an imperforate sheet of aluminum foil embedded in the upper layer as shown in U.S. 2,785,099.

U.S. 3,074,505 describes a metal faced acoustical tile in which the metal foil is bent over the edge of the tile and the metal sheet is attached to the tile by piercing the facing with a polygonal tool to curl the metal into the backing.

It is an object of this invention to provide a fire resistant ceiling board having good acoustical properties and which is resistant to sag and warping.

It is a further object to provide a fire resistant ceiling board in easily handled sheet form which can be used with the standard grid system.

A still further object is to provide a fire resistant ceiling board having good strength and sound absorbing properties and an attractive appearance.

In a broad embodiment, this invention comprises adhering a thin layer of metallic foil to an acoustical tile and then perforating the foil, and the tile.

More particularly, this invention comprises coating the back surface of an acoustical tile with a water-base polyvinyl alcohol paint and laminating to the face of the tile a steel foil of about 1–4 mils in thickness using an acrylic adhesive. The foil is then perforated using the desired pattern and the board is spray coated with a metal primer.

For use in low humidity areas, it is preferable that the finished board have a small amount of bend (up to between ¼″ and ⅝″ depending on the size of the board) concave to the face of the tile at the time the lamination takes place. This is accomplished by heating the face of the board to about 175–225° F. and the foil to about 150–200° F. and laminating them together while still hot. Because of the difference in thermal expansion of the board and foil, the steel foil pulls a concave bend in the board as the steel shrinks on cooling.

The commercially available acoustical tile compositions are made primarily from mineral wool and a starch binder. The tile or board must be strong enough so that the metal will remain smooth and not crumple during the perforating operation. Use of a board that is too hard will reduce the sound absorbing properties.

It is desirable to use a thin steel foil (about 1–4 mils) so that the foil may be easily perforated by machine into attractive patterns. If foil of much greater thickness is used, the holes must be punched individually or drilled, which is time consuming and expensive.

In order to get good sound absorption, it is necessary to punch the holes to a depth of about ⅟₁₆ inch from the back of the acoustical tile. When the foil is perforated, the metal fans out to form claw-like projections which increase the bond of the foil to the acoustical tile. It is preferable to have many holes of small size—about 1400 holes per square foot. The perforations increase the sound absorbing properties of the foil-coated tile and present a more attractive appearance.

The foil is trimmed and laminated to the board so that it extends to ⅛ inch from each edge of the board. Thus the foil lies flat on the board and presents a smooth appearance. After the foil is perforated, the metal-faced board is spray coated with a metal primer to coat any raw metal in the holes.

The foil used may be either plain or coated with a metal such as tin. The foil must be clean to insure good adhesion to the board. A suitable method of cleaning the foil is dipping the foil into a phosphate bath (a dilute solution of phosphoric acid saturated with ferrous phosphate).

For a more complete understanding of the invention, reference is made to the following specific examples which are set forth for illustrative purposes only.

EXAMPLE I

A 15 lb. ceiling board ⅝″ x 2′ x 4′ consisting of 76% mineral wool, 2.5% starch binder, 11.5% gel binder and 10% perlite was made by forming an aqueous slurry of the components, forming into a sheet, drying, and cutting the sheet into boards of the desired size. The back surface of the board was coated with a water-base polyvinyl alcohol paint. A piece of steel foil 2 mils in thickness was dipped into an iron phosphate-phosphoric acid bath and then coated with a metal primer. The foil was trimmed so that it would extend to ⅛″ from each edge of the board. The foil was laminated to the face of the board with an acrylic adhesive. The foil was then perforated to provide 1400 holes per square foot and spray coated with a water base paint. The board was kept at 90° F. and 90% humidity for four weeks and showed a negative sag of about .040″. The board had an NRC value of 73 and the ceiling construction made from it had a sound attenuation of 46.

EXAMPLE II

An 18 lb. ceiling board ¾″ x 2′ x 4′ consisting of the same composition as in Example I was made by the same process as in Example I. The back surface was coated with a water-base polyvinyl alcohol paint. A piece of steel foil 3½ mils in thickness was trimmed so that it would extend to ⅛″ from each edge of the board and laminated to the face of the board with an acrylic adhesive. The foil was perforated and spray coated with a water base paint. After four weeks at 90° F. and 90% humidity the board showed a negative sag of .040″. The board had an NRC value of 70, MOR of 532 and flame spread of 25.

EXAMPLE III

An 18 lb. ceiling board ¾″ x 2′ x 4′ consisting of 74.5% mineral wool, 3% starch, 11% kraft gel binder (having a minimum modified TAPPI freeness of at least 8 minutes), 9.5% perlite, 1% alum and 1% wax size was made by forming an aqueous slurry of the components, forming into a sheet, drying and cutting the sheet into boards of the desired size. The back surface of the board was coated with a water-base polyvinyl alcohol paint. An acrylic terpolymer was applied to the face of the board and the board was passed under quartz infrared lamps so that the board face was heated to about 200° F. A piece of steel foil 2 mils in thickness was dipped in a phosphate bath and treated with a vinyl primer. The treated foil was trimmed so that it would extend to 1/8" from each edge of the board, heated to about 175° F. and laminated to the face of the board while the board and foil were still hot. The shrinkage of the steel on cooling pulled a 1/4" bend in the board. The foil was then perforated and spray-coated with a water-base vinyl paint. The board was kept at 90° F. RH for four weeks and showed a sag of minus .092". The board had an NRC value of 70, light reflectance of 82%, a flame spread of 18 (ASTM #E84 tunnel test), and an MOR of 532 pounds per square inch. The ceiling constructed from the boards had a sound transmission coefficient of 46.

The gel binder referred to in the examples is made by gelatinizing and refining a slurry of unbleached waste kraft paper until a kraft gel with a TAPPI freeness of at least 8 minutes was obtained.

Ceiling boards produced in accordance with this invention are resistant to fire and have good acoustical properties. The boards have good strength and are resistant to sag and warping. In addition, the boards are easily handled, can be used with the standard grid system, and the surface is washable and easy to clean. The boards can be cleaned in place or can easily be taken down for cleaning.

Having thus described and exemplified my invention, I claim:

1. An acoustical ceiling board comprising a metal facing sheet adhered to a porous backing board with an acrylic adhesive, said facing sheet extending to within about 1/8 inch from each edge of said backing board and having perforations extending through said sheet and to within about 1/16 inch from the back surface of said backing board.

2. The product of claim 1 in which the metal facing sheet is a steel foil of about .001 to about .004 inch thick.

3. The product of claim 1 in which the acoustical ceiling board is coated with a layer of paint.

4. The product of claim 1 in which the backing board has a 1/4"–5/8" bend concave to the surface of the facing sheet.

5. The product of claim 1 in which the backing board consists of about 76% mineral wool, about 3% starch, about 11% kraft gel binder having a minimum modified TAPPI freeness of at least 8 minutes, and about 10% perlite.

6. The product of claim 1 in which the number of the perforations is about 1400 holes per square foot.

7. The method of making an acoustical ceiling board which comprises adhering a metal facing sheet to a porous backing board with an acrylic adhesive so that said facing sheet extends to within about 1/8 inch from each edge of said backing board, perforating said facing sheet and backing board to within about 1/16 inch from the back surface of said backing board, and spraying the metal facing sheet with a paint.

8. The method of claim 7 in which the back face of the porous backing board is coated with a water-base polyvinyl alcohol paint prior to application of the metal facing sheet.

9. The method of making an acoustical ceiling board which comprises heating a porous backing board and a metal facing sheet, adhering the hot facing sheet to the hot board with an acrylic adhesive so that said facing sheet extends to within about 1/8 inch from each edge of said backing board, perforating said facing sheet and backing board to within about 1/16 inch from the back surface of said backing board, and spraying the metal facing sheet with a paint.

10. The method of claim 9 in which the back face of the porous backing board is coated with a water-base polyvinyl alcohol paint prior to application of the metal facing sheet.

11. The method of claim 9 in which the face of the board is heated to between 175 and 225° F. and the foil is heated to between 150 and 200° F.

References Cited

UNITED STATES PATENTS

| | | |
|---|---|---|
| 2,413,568 | 12/1946 | Hurley. |
| 2,562,711 | 7/1951 | Gessler et al. ____ 156—253 XR |
| 2,745,779 | 5/1956 | Ritter et al. _____ 156—252 XR |
| 3,074,505 | 1/1963 | Schulz. |
| 3,080,938 | 3/1963 | Grohmann _____ 181—33 |
| 3,097,124 | 7/1963 | Denenberg _____ 156—253 XR |
| 3,422,920 | 1/1969 | Greason et al. _____ 161—44 XR |
| 3,437,551 | 4/1969 | Marshack _____ 156—253 XR |

ROBERT S. WARD, Jr., Primary Examiner

U.S. Cl. X.R.

156—253; 161—44, 149, 160